Oct. 17, 1967   D. R. AHLBECK ETAL   3,347,135
FAST-ACTING CASCADE VALVE
Filed Sept. 2, 1966
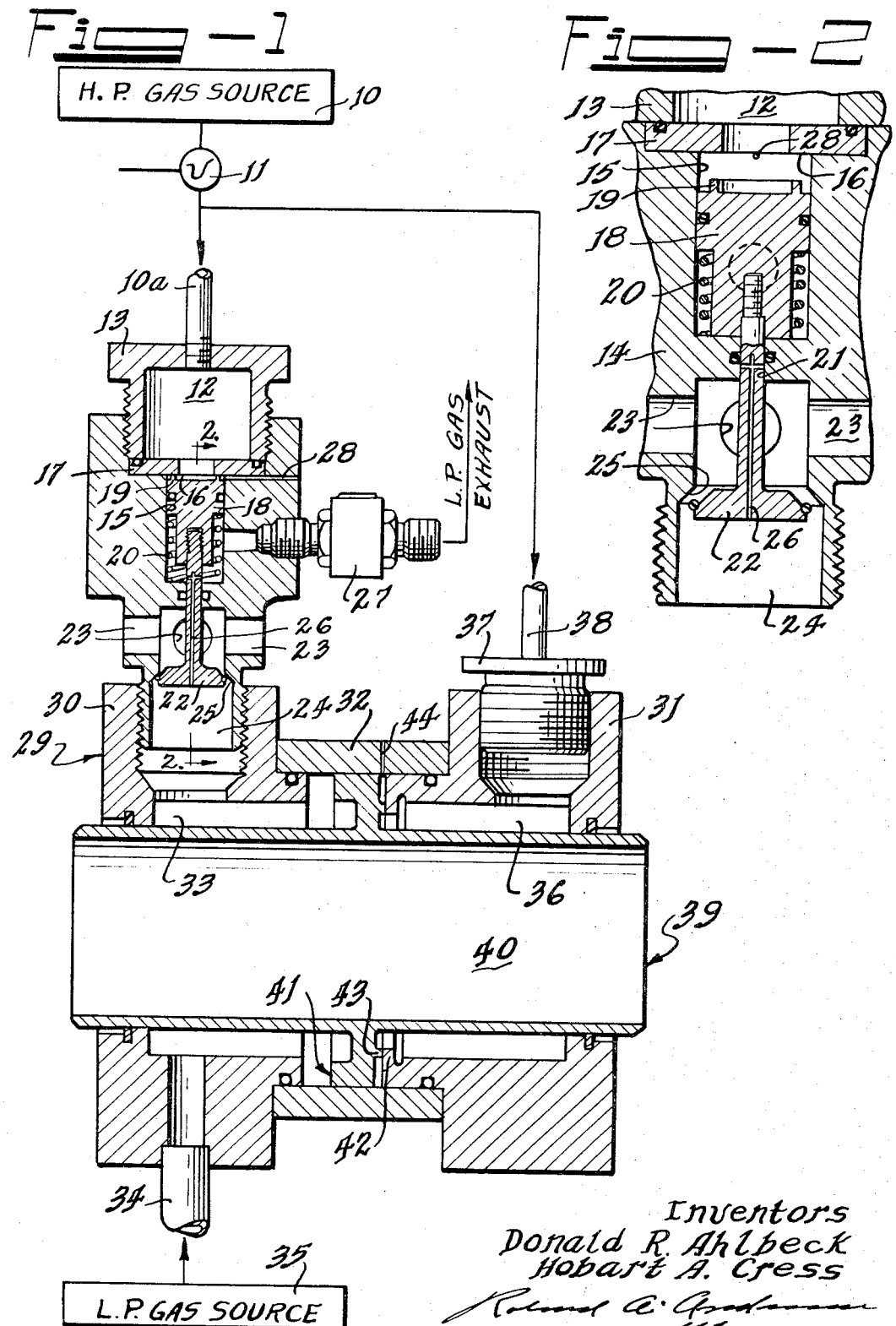
Inventors
Donald R. Ahlbeck
Hobart A. Cress
Attorney

United States Patent Office 3,347,135
Patented Oct. 17, 1967

3,347,135
FAST-ACTING CASCADE VALVE
Donald R. Ahlbeck, Worthington, and Hobart A. Cress, Columbus, Ohio, assignors to the United States of America as represented by the United States Atomic Energy Commission
Filed Sept. 2, 1966, Ser. No. 577,093
3 Claims. (Cl. 91—47)

ABSTRACT OF THE DISCLOSURE

A high-pressure chamber is sealed from a first low-pressure chamber with a small volume by a piston in the low-pressure chamber. When the piston seals the high-pressure chamber only a small area is exposed to the high-pressure chamber, but in an unsealing position a large area is exposed to the high-pressure chamber. A valve head connected to the piston seals a second low-pressure chamber from exhaust vents. When a small amount of pressure is released from the first low-pressure chamber a large area of the piston is exposed to the high-pressure chamber and the piston is quickly moved. The valve head then unseals the second low-pressure chamber which vents.

---

The invention described herein was made in the course of, or under, a contract with the United States Atomic Energy Commission.

This invention generally relates to a fast-acting valve and in particular to a valve assembly in which one valve triggers another valve.

When a power member is to be moved fast and forcefully by change in fluid pressure acting thereon and such pressure change is effected by a valve, it is necessary that the valve move quickly through an appreciable distance in order that the valve opening may be large enough to produce a quick significant pressure change.

According to the present invention, quick significant movement of the valve is brought about by the use of a triggering valve and a relatively small space or volume controlled by the triggering valve. Because the space is small, the pressure of the fluid therein diminishes rapidly, even with a relatively slow small movement of the triggering valve, and produces the said quick significant movement of the main valve.

In the drawing:

FIG. 1 is a sectional view of the valve assembly of the present invention and power unit to which it is operatively connected; and FIG. 2 is an enlarged sectional view taken along line 2—2 of FIG. 1 and showing the valve assembly in venting position.

With reference to FIG. 1, a source 10 for high-pressure fluid is connected by a line 10a having a valve 11 with a high-pressure chamber 12 formed within a fitting 13. The fitting has a threaded attachment with a body 14 and is in effect a part of the body. Adjacent the chamber 12 the body 14 has a cylindrical space 15 for low-pressure fluid. Between the chamber 12 and the space 15 lies an annular seat 16, which is formed by the portions of an apertured plate 17 surrounding a central opening therein. A piston 18 located in space 15 has on its head an annular rib 19, which is spaced from the periphery of the piston and is engageable with the annular seat 16. When the rib 19 engages the seat 16, only the portion of the head of the piston 18 lying within the rib 19 is exposed to the high-pressure fluid in the chamber 12. When as in FIG. 2 the rib 19 does not engage the seat 16, the entire head of piston 18 is exposed to high-pressure fluid.

A coil spring 20, which embraces the piston 18 and acts against the end of the space 15 away from the chamber 12 exerts a force on piston 18 toward chamber 12. The end of the space 15 away from the chamber 12 has an opening 21 which sealingly receives the stem of a valve 22. Beyond the opening 21 the body 14 has a plurality of vents 23 to the atmosphere. Beyond the vents the body 14 has a chamber 24 for low-pressure fluid. At the end of the chamber 24 toward the vents 23 the body 14 has an annular seat 25, with which the head of the valve 22 is engageable. The stem of the valve 22 has a threaded attachment with the piston 18. The valve 22 has a restricted passageway 26 which has one end opening to the side of the valve head away from the stem and the other end opening to the exterior of the valve at a region of the stem spaced an appreciable distance from the head. When as in FIG. 1 the piston 18 is positioned with the rib 19 against the seat 16, the open end of the passageway 26 in the stem of the valve 22 lies within the space 15, so that the low-pressure chamber 24 is connected with the space 15. When as in FIG. 2 the piston is positioned with the rib 19 spaced from the seat 16, the open end of the passageway 26 in the stem of the valve 22 is closed by the opening 21 in the body 14, so that the space 15 is cut off from the low-pressure chamber 24. A solenoid valve 27, which acts as a trigger to the valve 22, as will become presently apparent, is attached to the body 14 and is connected to the space 15 for exhausting it. There is a bleed hole 28 extending from the end of the space 15 at the plate 17 to the atmosphere.

The body 14 has a threaded connection though its end where the low-pressure chamber 24 is located, with a housing 29 of a power unit. The housing 29 is composed of two end members 30 and 31 and a cylinder 32 secured between them by means (not shown). The body 14 is threaded into the end member 30 so that a chamber 33 therein is connected with the low-pressure chamber 24 in the body 14 and forms an extension of such chamber. The chamber 33 is connected by a line 34 with a source 35 of low-pressure fluid. The end member 31 has a chamber 36, which is connected with the source 10 of high-pressure fluid by a fitting 37 and a line 38, which is connected with the line 10a so that the valve 11 can control the high-pressure fluid serving the chamber 36.

Positioned within the housing 29 is a power member 39, which comprises a hollow cylinder 40 and a piston 41 in the form of an annular flange exterior to and integral with an intermediate portion of the cylinder 40. The end portions of the cylinder 40 have sliding sealing engagement with the end members 30 and 31, and the piston 41 slidably engages the interior of the cylinder 32 for limited longitudinal movement of the power member 39 between positions of engagement of the flange 42 with the end members 30 and 31. The end of the end member 31 facing the piston 41 has an inwardly directed flange 42, which is engageable with an annular rib 43 on the facing end of the piston 41, which rib is spaced radially inwardly from the periphery of the piston. By virtue of the flange 42 and the rib 43, the high-pressure fluid in the chamber 36 acts against the relatively small area of the piston 41 lying within the rib 43 when the power member 39 is positioned as in FIG. 1 with the rib 43 in engagement with the flange 42; and the high-pressure fluid acts against the relatively large area of the entire right end of the piston 41 when the power member 39 has moved to the left of the position of FIG. 1 and the rib 43 no longer engages the flange 42.

When the solenoid valve 27 is closed, and the piston 18 and valve 22 are in the position of FIG. 1, the valve 22 engages the seat 25, and so the pressure of the low-pressure fluid of the source 35 is maintained in the chambers 33 and 24 and transmitted through the restricted passageway 26 in the valve 22 to the space 15. The relationship of the spring 20, the area of the valve 22, the area of the end of the piston 18 to which the valve is connected, the pressures of the low-pressure fluid and high-pressure fluid, and the area of the head of the piston 18 within the annular rib 19 is such that the spring 20 and low-pressure fluid somewhat overbalance the high-pressure fluid so that the piston 18 is urged upwardly and contact between the rib 19 and the annula seat 16 is maintained.

The operation of the present apparatus is started or triggered by opening of the solenoid valve 27, which causes a pressure drop in pressure in the space 15. Since the passageway 26 is restricted, there is no immediate tendency for equalization of the pressure in the space 15 and that of the chamber 24. Because of the pressure drop in the space 15, the piston 18 moves to space the rib 19 from the seat 16. Immediately, the area of the piston 18 against which the high-pressure fluid in the chamber 12 acts, becomes appreciably greater, as does the total force on the piston 18 by the high-pressure fluid. Thus the piston 18 and the valve 22 are moved downwardly more positively to the position of FIG. 2, in which the valve 22 is spaced from the seat allowing the low-pressure fluid in the chambers 24 and 33 to be dumped. At the same time the open end of the passageway 26 in the stem of the valve 22 is closed by being covered by the portion of the body 14 in which the opening 21 is located.

It should be noted that the piston 18 fairly well fills up the space 15. Thus, the volume of pressure fluid controlled by the solenoid valve 27 is quite small, and the drop in pressure of the fluid is quick and appreciable on opening of the solenoid valve, even though the size or the speed of the opening may be small. The result is that the piston 18 immediately moves its rib 19 away from the seat, so that the total pressure exerted by the high-pressure fluid in the chamber 12 is suddenly appreciably increased. As a consequence, the piston 18 moves rapidly from the position of FIG. 1 to that of FIG. 2, bringing about a quick movement of the valve 22 away from the seat 25, with the result that the pressure of the low-pressure fluid in the chambers 24 and 33 is quickly reduced appreciably, because of dumping through the vents 23. This brings about a quick forceful movement of the power member 39 to the left, as will be presently apparent.

When the valve 22 engages the seat 25 and thus full pressure of the low-pressure fluid exists in the chambers 24 and 33, such full pressure is acting against the full area of the left end of the piston 41. The relationship of the pressures of the low-pressure fluid and high-pressure fluid, the full area of the left end of piston 41, and the reduced area of the right end of the piston 41 within the rib 43 is such as to keep the piston 41 in the position of FIG. 1 in which the rib 43 engages the flange 42. When the pressure of the low-pressure fluid acting against the left end of the piston 41 is reduced quickly and appreciably as aforesaid, because of quick movement of the valve 22 off the seat 25, the net force acting on the piston 41 shifts from rightward to leftward. The result is movement of the rib 43 away from the flange 42 and the opening up of the entire area of the right end of the piston 41 to high-pressure fluid in the chamber 36. Thus the total force on the piston 41 to the right of said piston is greatly increased, and the power member 39 is shifted quickly and forcefully to the left to carry out its function.

The power member 39 takes the form shown, namely, a hollow cylinder carrying an external annular piston, because the power member is intended, by quickly moving to the left, to stop the driving of, and to apply a braking force to, a rotating shaft (not shown), which extends through the power member 39 and is employed in a friction welder that is disclosed and claimed in the copending Cress and Walls application S.N. 591,349, filed November 1, 1966.

When the parts are to be restored in the position of FIG. 1, the valve 11 is manipulated to dump fluid from the high-pressure chambers 12 and 36, and the solenoid valve 27 is closed. With the chamber 12 vented, the spring 20 restores the piston 18 and valve 22 to the position of FIG. 1. The valve 22 again engages the seat 25 and the pressure in the chambers 24 and 33 build up to urge the piston 18 against the seat 16. The open end of the passageway 26 in the stem of the valve 22 is free of the opening 21 in the body 14, and so the pressure in the space 15 in the body 14 builds up. The bleed hole 28 in the body 14 prevents high-pressure fluid from being trapped at the head of the piston 18 outward of the rib 19 and thus assures engagement of the rib 19 with the seat 16. A bleed hole 44 extends through the wall of the cylinder 32 to the atmosphere from the interior of the cylinder just beyond the flange 42 of the end member 31. When the piston 41 is returned to the position of FIG. 1, any high-pressure fluid that might be trapped in the cylinder 32 outward of the annular rib 43 on the piston 41 escapes through the bleed hole 44, and so reengagement of the rib 43 with the flange 42 is assured.

The fluid supplied by the high-pressure source 10 and by the low-pressure source 35 may be dry nitrogen.

It is understood that the invention is not to be limited by the details given herein but that it may be modified within the scope of the appended claims.

The embodiments of the invention in which an exclusive property or privilege is claimed are defined as follows:

1. An assembly comprising:
   (a) a body having
      (i) a first chamber for fluid under high pressure;
      (ii) a space for fluid under low pressure;
      (iii) a first annular seat located between one end of the space and the first chamber;
      (iv) an opening formed at the other end of the space;
      (v) a vent beyond the opening and away from the space;
      (vi) a second chamber for fluid under low pressure and being located to the side of the vent away from the space, the second chamber being connected to said vent;
      (vii) a second annular seat formed at the end of the second chamber toward the vent;
   (b) a first valve having a head located in the second chamber engageable with the second seat so as to seal the second chamber from the vent, the first valve having a stem extending from the head sealingly through said opening into the space;
   (c) a piston located in the space so as to leave a small volume available in the space for low-pressure fluid and connected to the stem, said piston being adapted to have a relatively small area exposed to the high-pressure fluid when in seating position with the first annular seat and to have a relatively large area exposed to the high-pressure fluid when not in seating position;
   (d) a second valve connected to the space and adapted for releasing low-pressure fluid therefrom, whereby high-pressure fluid when first acting against the relatively small area of the piston moves it off said first seat, and immediately thereafter when acting against the relatively large area of said piston moves it quickly, with the result that the head of the first valve is moved quickly off said second seat and low-pressure fluid in the second chamber may quickly escape through the vent; and
   (e) means in said space positioned to exert a force on the piston toward the first chamber;
      the first valve having a restricted passageway extending through the valve and having one end opening to the side of the head away from the stem and the other end opening to the exterior of the valve at a region of the stem spaced an appreciable distance from the head, the passageway serving to supply low-pressure gas from the second chamber to the space, the said other end of the restricted passageway being blocked by the said opening when the first valve is out of engagement with the second annular seat.

2. The assembly specified in claim 1 and further comprising means for supplying gas under high pressure to the first chamber; and means for supplying gas under low pressure to the second chamber.

3. The assembly specified in claim 1 and further comprising:
   (a) a cylindrical power member having an external annular flange located at an intermediate region of the power member; and
   (b) a housing having a chamber and containing the power member and slidably engaging the same near its ends and at its annular flange in sealing relationship, said flange dividing the chamber into two sections;
      (1) one section of said chamber having a fluid under high pressure therein;
      (2) the other section of said chamber having a fluid under low pressure therein;
         the housing further having
      (3) an annular seat located in the said one section of the chamber so as to be engageable with one side of the annular flange so that when the flange engages said seat a relatively small area of the flange is exposed to the high-pressure fluid and when not engaging said seat a relatively large area of the flange is exposed to the high-pressure fluid;

the body being connected to the housing so as to place the second chamber of the body in communication with the said other section of the chamber in the housing, whereby unseating of said first valve causes rapid escape of low-pressure fluid not only from the second chamber of the body but also from the said other section of the chamber in the housing, as well as a rapid reduction in pressure in the said other section of the chamber in the housing, with the result that the high-pressure fluid in the said one section of the chamber in the housing unseats the flange of the power member from the seat in the housing and now acts against the said relatively large area of the flange to to move the power member with an increased total force.

References Cited

UNITED STATES PATENTS

| | | | |
|---|---|---|---|
| 2,637,946 | 5/1953 | Packs | 91—47 |
| 3,093,117 | 6/1963 | Brown | 91—165 |
| 3,136,220 | 6/1964 | Kamm | 91—165 |
| 3,155,365 | 11/1964 | Hartung et al. | 251—31 |
| 3,200,715 | 8/1965 | Ottestad | 91—392 |
| 3,291,000 | 12/1966 | Ezekiel | 91—165 |

MARTIN P. SCHWADRON, *Primary Examiner.*

PAUL E. MASLOUSKY, *Examiner.*